(12) United States Patent
Carr

(10) Patent No.: X9490
(45) Date of Patent: Mar. 12, 1836

(54) STEAM, GENERATING

(76) Inventor: Job Carr

United States Patent Patent No.: X9490

Job Carr of Springborough Ohio

Letters Patent

The Schedule referred to in these Letters Patent and making part of the same
containing a description in the words of the said Job Carr himself of his
improvement in the Steam Generator or Boiler.

To all to whom these presents shall come. Be it known that
I Job Carr of Springborough in the County of Warren and State
of Ohio have invented a new and useful machine being an improve-
ment in the common Steam Generator or boiler for generating a
sufficient quantity of Steam for propelling any kind of machinery
to which steam now is or may hereafter be made applicable without any
danger of the boiler bursting or collapsing and that the following is an exact
description thereof. Make a reservoir of Copper Iron, or wood
lined with copper and secured in the following manner (of suf-
ficient size to generate the quantity of steam required always ma-
king allowance in the calculation for the size of the furnace as
the case may be) make the Bottom flat, sides straight or vertical
and top circular [illegible] two feet or more if required let a strong bar of
iron be placed under the bottom with a hole in each end exactly
even with the outside of the reservoir then another bar fitted to the
top and sides. the ends extending through the first bar and well secu-
red with a good nutt [illegible] two or more strong Bars fitted across each
end of the reservoir and let them extend round the corners with
holes in each end through which the bars that go over the top
at the ends are to pass before they are fastened at the bottom &
for the further support of the ends of the reservoir insert bars through the [illegible]
and let them pass through the ends and those bars on the ends
and secure them well at each end. The number of these middle
bars to be regulated by the size of the reservoir. The steam to be
generated in this reservoir by furnaces made of iron, copper, or any
other metallic substance with a flange at the front end to make.

them sown. the size and number of the furnaces to be governed by the
power required say for ordinary purposes from two to two and a half
feet on the Bottom with a circular top from 18 inches to two feet be-
more or less corresponding with the width of the furnaces running near-
ly the whole length of and coming through the front end of the reservoir
where the flange is to secure it. there is to be a door nearly the full
size of the furnace for the purpose of putting in fuel with a small
opening in the lower edge to admit air. the bottom of the furna-
at the front end to be grated and a false Bottom attached some-
outwards. for the purpose of catching and conveying out the fine coal
and ashes near the back end of the furnace insert a pipe of sufficient
size to convey the smoke off let it extend (the bottom of it about l-
el with the top of the furnaces) to the front of the reservoir when appli-
ed to propelling Boats there must be a partition between every two
furnaces water tight extending from three to six inches (owing to
the supply of water to be kept in the reservoir) above the top of the furn-
aces to prevent the water from leaving the furnaces in case of the boat
careening or have a separate reservoir for each furnace connect-
similar to the Boilers now in use. the water to be supplied in th-
reservoir and the steam taken from the same and applied to
the Engine on the most approved plan now in use.

What I claim as my own invention and not previously kn-
in the above described machine is the combination of the reservoir
and furnaces or improved Steam Generator and arrangement
of the combined parts as above described and for the uses and
purposes therein mentioned

Job Carr

Exd. Witnesses
[illegible] Isaac Mullin
James McEwen